UNITED STATES PATENT OFFICE.

FRANK T. LAHEY, OF AKRON, OHIO.

METHOD OF MANUFACTURING INSULATING AND RESISTANT ARTICLES AND PRODUCTS THEREOF.

1,422,720.　　　　Specification of Letters Patent.　　Patented July 11, 1922.

No Drawing.　　Application filed March 11, 1921. Serial No. 451,613.

*To all whom it may concern:*

Be it known that I, FRANK T. LAHEY, a citizen of the United States, residing at Akron, in the county of Summit and State of Ohio, have invented certain new and useful Improvements in Methods of Manufacturing Insulating and Resistant Articles and Products Thereof, of which the following is a specification.

The object of this invention is to improve upon methods for the manufacture of articles which possess to a high degree electrical, insulating and acid or alkali resisting properties, and to provide with such desirable qualities a high degree of strength and toughness. The articles produced by the process of this invention are particularly adaptable for use as electric insulators or containers for acids or alkalis and are especially useful as storage battery containers although the use of the material is not confined to such limits but extends to other and varied purposes.

Articles manufactured by the improved process of this invention are non-friable and non-fragile and are capable of withstanding shocks, rough handling and abrasion without breaking. As a further advantage, the process utilizes materials which have largely been considered as waste materials and is inexpensive and easily practised.

Other objects and advantages will be apparent as the description proceeds, it being understood that my process is not limited to the exact ingredients or methods of treatment but may be varied within the scope of my invention.

The process of my invention comprises the treatment of vegetable fibres with a weak solution of sodium hydrate in the presence of an oil and rubber, together with a suitable vulcanizing agent and other materials so as to produce a strong, non-breakable, acid and electric resisting material suitable for many industrial purposes:

The process may be carried out in a great variety of methods, but for the purposes of the present disclosure one particular type of process will be described in detail.

There is first obtained a suitable quantity of vegetable fibres. For this purpose use may be made of cotton fibres which have been coated with rubber, oils or resins of the $C_{10}H_{16}$ group, and the necessary vulcanizing ingredients such as sulphur, sulphides and the like.

This material is placed in a vessel and to it is added a weak solution of sodium hydroxide in the proportion of three parts by weight of the fibrous material to two parts of the hydroxide. The hydroxide is preferably a two per cent solution. To the material so prepared is added an amount of vulcanizable oil such as the residium of distillation of pine, coal, mineral, vegetable or fish oils, equal to ten per cent of the solid material in the mass.

The vessel is then closed and heated at approximately 250° F. for a period of from six to twelve hours, during which period of cooking the entire mass is preferably thoroughly agitated. After the cooking period is completed the mass is washed thoroughly to eliminate the uncombined alkali and oil. The mass is then dried to remove the moisture.

In the treatment which has just been described, several actions are believed to have taken place. The vegetable fibres are swelled or expanded, opening the pores and ducts thereof, into which the oils, hydrocarbons or resins of the $C_{10}H_{16}$ group have been absorbed, and the oils which were present will be found to be thoroughly and intimately encased by the distended fibre. The resins or rubbers will have been softened by the application of heat and will be thoroughly saturated within the fibre.

To the mass so obtained is then added an amount of comminuted waste vegetable cellulose equal to 5% to 20% of the weight of the original body of solids, and these ingredients are thoroughly mixed in heated mills which are used in compounding rubber. To the mass on the mills is added any one of a number of filling and vulcanizing ingredients such as, for example, an equal quantity of uncured rubber coated cotton waste, known in the trade as "friction," a quantity of rubber, preferably reclaimed rubber, equal to two thirds of the mass, a quantity of sulphur in the proportion of 10 ounces of sulphur to three pounds of the original mass, a small amount of lime and hydrocarbon.

After thoroughly mixing these ingredients on the mills, the material thus obtained is formed in the desired shapes in sheets or molds and vulcanized under pressure and temperature of the degree required for a sufficient length of time to cure to any desired degree of hardness.

As a result of the process thus described, there is obtained a material possessing a number of qualities which suits it for the manufacture of alkali and acid resisting articles, electric insulating material, battery containers or the like.

The presence of the undestroyed and uncharred fibres, which have been swelled or plumped by the treatment with the alkali and simultaneously impregnated and encased with the acid and alkali resisting materials makes a strong, unbreakable and highly resistant material.

While the description has been given very minutely so as to enable one skilled in the art to practice the invention, the proportions, ingredients and method of treatment may be varied without departing from the invention.

I claim.

1. A method of manufacturing material of the character described, comprising the steps of treating vegetable fibres with a dilute alkali solution, in the presence of a vulcanizable oil and rubber at a temperature which does not destroy the structure of the fibre, adding a vulcanizing agent and heating until the oil is precipitated within the structure of the fibre and the material is vulcanized.

2. A method of manufacturing material of the character described, comprising the steps of treating vegetable fibres with an alkali solution which will not destroy the structure of the fibres in the presence of an oil which will be subsequently precipitated by sulphur, said treatment with alkali being continued until the oil enters within the structure of the fibre, adding rubber and sulphur to the fibre so treated and vulcanizing.

3. A method of manufacturing material of the character described, comprising the steps of treating vegetable fibres with a dilute alkali solution in the presence of a vulcanizable oil and rubber, so that the fibres are rendered open and porous, are not mercerized and do not lose their structural form, whereupon the oil and rubber enters into the structure of the fibre, adding the vulcanizing agent to the fibre so treated and vulcanizing.

4. A method of manufacturing acid and alkali resistant materials comprising treating vegetable fibres with a dilute alkali solution to swell said fibres in the presence of a vulcanizable oil, the oil entering into the said fibres, combining said oil saturated fibres with rubber and vulcanizing agent and vulcanizing.

5. A method of manufacturing materials comprising the steps of heating vegetable fibres with an alkali solution to increase the absorptive properties of said fibres in the presence of a vulcanizable oil and rubber whereby the oil and rubber enter immediately into the fibres, adding to the mass so obtained a further quantity of rubber and a vulcanizing agent, forming articles therefrom, and vulcanizing.

6. A method of manufacturing materials comprising the steps of heating cotton fibres with a solution of sodium hydroxide of such strength as to swell the fibres without destroying or mercerizing them, in the presence of a vulcanizable oil which will enter into the pores of the fibre, the said mass also containing a vulcanizable colloid which likewise enters the pores of the cotton fibre, and subsequently compounding and vulcanize the material.

7. A method of manufacturing materials comprising the steps of heating cotton fibres with a solution of an alkali so as to increase the absorptive properties of the fibres without destroying or mercerizing them, said treatment with alkali taking place in the presence of a vulcanizable colloid.

8. A method of manufacturing materials comprising the steps of treating cotton fibre with a solution of an alkali so as to increase the absorptive properties of the fibres without destroying or dissolving them, said treatment taking place in the presence of a vulcanizable oil and a vulcanizable colloid, compounding the mass with a vulcanizing agent and vulcanizing.

9. A method of manufacturing articles for use as electric insulators or the like comprising the steps of treating fibrous material with a two per cent solution of sodium hydroxide, in the presence of a vulcanizable oil and rubber, heating the said materials for a sufficient period and at a temperature to increase the absorptive properties of the fibres whereby the oil and rubber enter into the structure of the fibre, freeing said mass of uncombined alkali and oil, compounding the mass with rubber and sulphur, shaping articles therefrom and vulcanizing the articles.

10. A method of manufacturing articles for use as electric insulators or the like comprising the steps of treating cotton fibres with a two per cent solution of sodium hydroxide in the presence of an oil and rubber, heating said materials for a sufficient period and at a temperature so as to allow the sodium hydroxide to increase the absorptive properties of the fibres, washing the mass so obtained to free it from uncombined alkali and oil, compounding the mass with a vulcanizing agent, forming articles therefrom and vulcanizing the articles.

11. The herein described hard, dielectric material comprising vulcanized rubber, throughout which is distributed a mass of fibrous material which is expanded so as to be absorbent without losing its structure and within the structure of which is precipitated a sulphuretted oil.

12. The herein described hard, dielectric material comprising vulcanized rubber, throughout which is distributed a mass of fibrous material which is expanded so as to be absorbent without losing its structure and within the structure of which is held a sulphuretted oil and vulcanized rubber.

FRANK T. LAHEY.